United States Patent
Tsai

(10) Patent No.: US 6,661,193 B2
(45) Date of Patent: Dec. 9, 2003

(54) STEPPING MOTOR DRIVING APPARATUS WITH DYNAMIC TORQUE CONTROL

(75) Inventor: Chi-Sung Tsai, Hsinchu (TW)

(73) Assignee: Avision Inc., Hsinchu (TW)

( * ) Notice: Subject to any disclaimer, the term of this patent is extended or adjusted under 35 U.S.C. 154(b) by 35 days.

(21) Appl. No.: 10/118,065

(22) Filed: Apr. 9, 2002

(65) Prior Publication Data
US 2002/0195985 A1 Dec. 26, 2002

(30) Foreign Application Priority Data
Jun. 26, 2001 (TW) ........................... 90115493 A

(51) Int. Cl.7 ................................. H02P 8/00
(52) U.S. Cl. ....................... 318/696; 388/908
(58) Field of Search ............. 318/696; 388/908; 360/10.3

(56) References Cited

U.S. PATENT DOCUMENTS 4,380,733 A  *  4/1983  Yano et al. ............... 324/166
4,649,439 A  *  3/1987  Tanaka ..................... 386/76
4,710,825 A  * 12/1987  Okita et al. ............. 386/119
5,872,586 A  *  2/1999  Shio ........................ 347/116

\* cited by examiner

Primary Examiner—Karen Masih
(74) Attorney, Agent, or Firm—Rabin & Berdo, P.C.

(57) ABSTRACT

A stepping motor driving apparatus with dynamic torque control includes a motor controller, a motor driver, and a frequency-to-voltage converter. In practice, the clock signals are sent to the motor driver and the frequency-to-voltage converter. When the motor is required to increase its speed, the system will increase the frequency of the clock signal CK. The reference voltage Vr will synchronously increase and generate higher driving current to drive the stepping motor so that the torque becomes larger. Besides, when the system fails and causes the stepping motor to run stiff, the system will reduce the driving current to the minimum automatically. It effectively avoids excessive heating and increases the security to the system.

12 Claims, 2 Drawing Sheets

STEPPING MOTOR DRIVING APPARATUS WITH DYNAMIC TORQUE CONTROL

This application incorporates by reference of Taiwan application Serial No. 090115493, filed Jun. 26, 2001.

BACKGROUND OF THE INVENTION

1. Field of the Invention

The invention relates in general to a motor driving apparatus, and more particularly to a stepping motor driving apparatus.

2. Description of the Related Art

The motor has been the core of almost every automation apparatus. In order to correspond with different requirements for using in different environments, several kinds of motors having different properties have been developed. Some of them possess the advantage of high-efficiency while some of them fulfill the requirement of speed and positioning. Among several types of motors, the stepping motor plays an important role in the controlling system due to its steady speed and precise positioning. Therefore, the way to accurately control the dynamic property has become a very important issue.

There are two types of commonly used stepping motor: PM (Permanent Magnet) motors and Hybrid motors. Besides, the constant voltage driver and the constant current driver for the stepping motor are in common use. Since the constant current driver uses an extra set of switching transistors to eliminate the need for two power sources and offers high performance and high efficiency in operation, it therefore becomes by far the most widely used driver for industrial applications. Hence, the constant current driving of the stepping motor is taken as an example as the following. Referring to FIG. 1, the block diagram of a conventional stepping motor driving apparatus shows the coupling relation among components. Conventionally, the motor controller 120 is used for controlling the operation of the stepping motor 150. In practice, the control signal CT is first sent to the motor controller 120. The clock signal CK for operating the stepping motor 150 is generated by the motor controller 120 according to the content of the control signal CT, and then sent to the motor driver 140. After receiving the clock signal CK and reference voltage Vr, the motor driver 140 generates the corresponding driving signal 145 according to the two signals CK and Vr. The driving signal 145 is used for controlling the operation of the stepping motor 150. Since the motor driver 140 is a constant current driver, the reference voltage Vr is received and converted into the driving current by the motor driver 140 for driving the current accordingly. The operation property of the stepping motor will be illustrated as follows with reference to the accompanying drawings.

Referring to FIG. 2, the operation property of a stepping motor driven by a rated current is shown. The x-coordinate represents the clock frequency, which is the frequency of clock signal CK, while the y-coordinate represents the torque value of the stepping motor. The curve on the graph indicates the variation of the torque of the stepping motor corresponding to the change of the clock frequency when the stepping motor 150 is driven by the constant current I. The torque of the stepping motor is T1 while the clock frequency is f1 and the torque of the stepping motor is T2 while the clock frequency is f2. As shown in FIG. 2, the clock frequency increases as the torque of the stepping motor decreases. The higher clock frequency means the higher motor speed. Therefore, in the condition of constant driving current I, the motor speed increases as the torque of the stepping motor decreases so that the load capacity of the motor reduces.

Conventionally, the clock signal CK of the motor controller 120 is the signal for controlling the stepping motor 150. As shown in FIG. 1, it might cause the damage of the stepping motor when the motor controller is abnormal. For example, the stepping motor operates at a high speed and the system fails due to the bug or unusual operating procedures. The stepping motor might probably run stiff and then too much current will cause excessive heating and damage to the motor windings and even destroy the stepping motor. By design, reducing the current flow to the motor by a small percentage will smooth the rotation. However, the maximum of the driving current has to be reduced accordingly. It decreases the maximum speed of the system and the efficiency of the stepping motor, which might be quite uneconomical.

SUMMARY OF THE INVENTION

It is therefore an object of the invention to provide a stepping motor driving apparatus with dynamic torque control, improving the vibration on the motor by the adjustment of the driving current and raising the rate of power usage.

It is another object of the invention to provide a stepping motor driving apparatus with dynamic torque control, avoiding destroying the stepping motor by the protection of over-current flow while the system fails.

The invention achieves the above-identified objects by providing a stepping motor driving apparatus with dynamic torque control, capable of driving a stepping motor. The stepping motor driving apparatus includes a motor controller, a motor driver, and a frequency-to-voltage converter. After receiving a control signal, the motor controller generates a corresponding clock signal according to the type of the control signal and outputs a clock signal to the motor driver and the frequency-to-voltage converter. The frequency-to-voltage converter receives the clock signal, generates a reference voltage corresponding to the frequency of the clock signal, and outputs the reference voltage to the motor driver. After the motor driver receives the clock signal from the motor controller and the reference voltage from the frequency-to-voltage converter, the motor driver generates a corresponding driving current accordingly and uses the clock signal and driving current to control the operation of the stepping motor.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
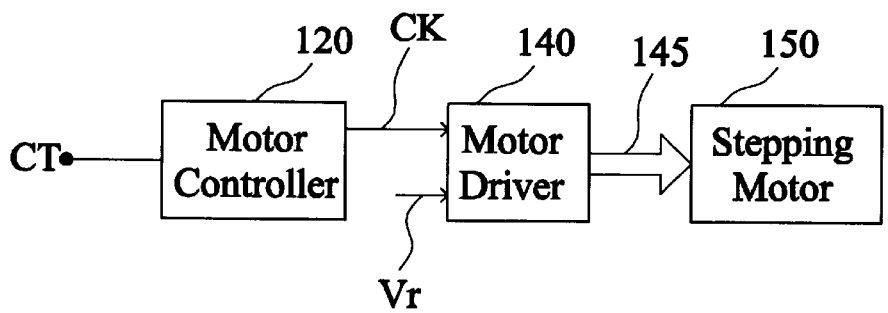
FIG. 1 is a block diagram showing a conventional stepping motor driving apparatus.
Figure 2:
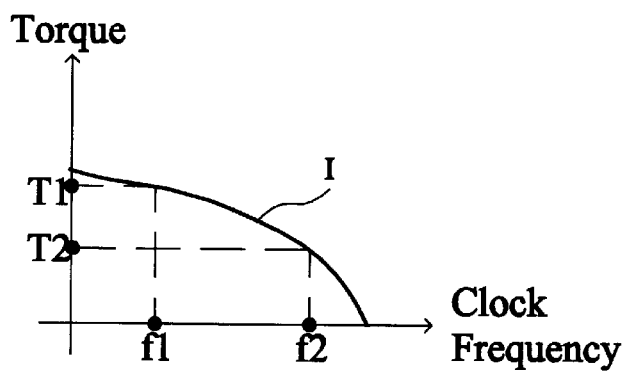
FIG. 2 illustrates the operation property of a stepping motor driven by a rated current.
Figure 3:
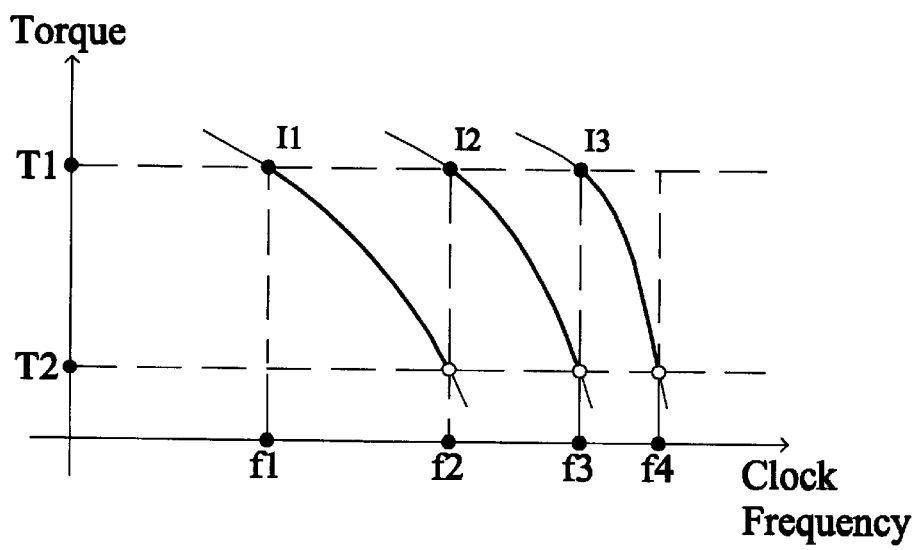
FIG. 3 illustrates the operation property of a stepping motor having multi-phase driving current modulation.

As the aforementioned description, in the condition of constant driving current of the stepping motor, the motor speed increases as the torque of the stepping motor decreases so that the load capacity of the motor reduces. In order to produce outputs with high torque at the high motor speed, it is also required to rank the increasing driving current of the stepping motor as several phases at the time of the speed gradually increasing. Thus, the stepping motor has the characteristic of high torque at high speed. Referring to FIG. 3, the operation property of a stepping motor having multi-phase driving current modulation is illustrated. The nearest curve to the origin shows the operation property of the stepping motor driven by constant current I1, the middle curve shows the operation property of the stepping motor driven by constant current I2, the farthest curve to the origin shows the operation property of the stepping motor driven by constant current I3, and I1<I2<I3. As clearly illustrated in FIG. 3, the higher the driving current, the higher the torque when the stepping motor runs at the same speed. If the stepping motor is driven by the constant current I1, the torque of the stepping motor gradually decreases from T1 to T2 as the clock frequency gradually increases from f1 to f2. If the stepping motor is driven by the constant current I2 the moment the clock frequency increases to f2, the torque of the stepping motor will rapidly increase to T1. Similarly, the torque of the stepping motor continues to gradually decrease after the clock frequency is higher than f2. If the stepping motor is driven by the constant current I3 the moment the clock frequency increases to f3, the torque of the stepping motor will rapidly increase to T1. That is, the stepping motor is driven by current I1 as the clock frequency is lower than f2, driven by current I2 as the clock frequency is between f2 and f3, and driven by current I3 as the clock frequency is between f3 and f4. Since the driving current varies with the motor speed, the stepping motor can produce dynamic outputs with high torque at the high speed. The stepping motor driving apparatus of the invention may be disposed in a fax machine, a copying machine, a printer, or a multi-function peripheral (MFP).

Figure 4A:
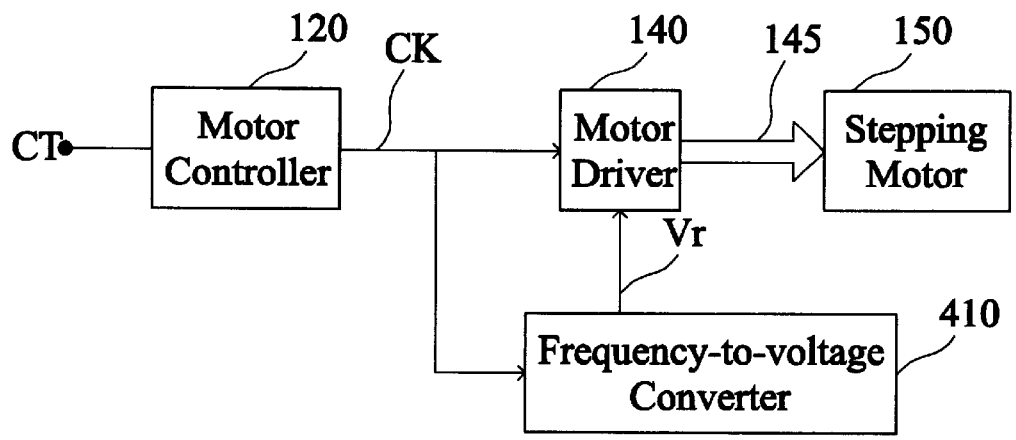
FIG. 4A is a block diagram showing a stepping motor driving apparatus with dynamic torque control according to a preferred embodiment of the invention.

Referring to FIG. 4A, a block diagram of a stepping motor driving apparatus with dynamic torque control according to a preferred embodiment of the invention is shown. The stepping motor driving apparatus with dynamic torque control is used for driving a stepping motor and includes a motor controller 120, a motor driver 140, and a frequency-to-voltage converter 410. The coupling relation among components is shown as FIG. 4A. After receiving a control signal CT, the motor controller 120 generates a corresponding clock signal CK according to the type of the control signal CT and then outputs the clock signal CK to the motor driver 140 and the frequency-to-voltage converter 410. The frequency-to-voltage converter 410 coupled with the motor controller 120 receives the clock signal CK and then generates a reference voltage Vr, the frequency of which corresponds to the frequency of the clock signal CK, for being sent to the motor driver 140. The motor driver 140 is coupled to the motor controller 120 and the frequency-to-voltage converter 410. After receiving the clock signal CK and reference voltage Vr, the motor driver 140 generates a corresponding driving current according to the reference voltage Vr and generates a driving signal 145 by using the clock signal CK and the driving current to control the operation of the stepping motor 150. It therefore achieves the goal of dynamic torque control. For example, when the motor is required to increase its speed, the system will increase the frequency of the clock signal CK. The reference voltage Vr depends on the frequency of the clock signal CK. When the frequency of the clock signal CK increases, the reference voltage Vr will synchronously increase and generate higher driving current. After the driving current increases, the torque becomes larger. Since the torque is synchronous with the motor speed, the torque increases as the motor speed increases. On the contrary, when the motor is required to decrease its speed, the system will decrease the frequency of the clock signal CK so that the reference voltage Vr decreases synchronously for providing lower driving current reference voltage Vr and the smaller torque is obtained.

As for how to achieve the function of frequency-to-voltage converter 410, it is easy for any person skilled in the art to purchase an IC (Integrated Circuit) with the above-mentioned function.

Figure 4B:
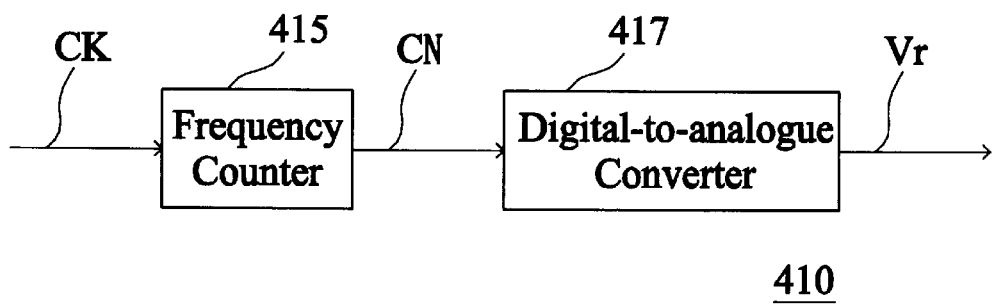
FIG. 4B is a block diagram showing a frequency-to-voltage converter of FIG. 4A.

Referring to FIG. 4B, which is a block diagram showing a frequency-to-voltage converter of FIG. 4A. The frequency-to-voltage converter 410 includes a frequency counter 415 and a digital-to-analogue converter 417. The digital-to-analogue converter 417 is coupled with the frequency counter 415. In practice, the clock signal CK is first sent to the frequency counter 415. After receiving the clock signal CK, the frequency counter 415 generates a corresponding counting signal CN accordingly and outputs it to the digital-to-analogue converter 417. The digital-to-analogue converter 417 receives the counting signal CN and generates a corresponding reference voltage Vr accordingly for being outputted. For example, when the clock signal CK is high, the counting value of the counting signal CN generated by the frequency counter 415 will be high and the reference voltage Vr outputted by the digital-to-analogue converter 417 will be high as well. On the contrary, when the clock signal CK is low, the counting value of the counting signal CN generated by the frequency counter 415 will be low and the reference voltage Vr outputted by the digital-to-analogue converter 417 will be low as well. Therefore, no matter how the reference voltage Vr changes, the reference voltage Vr varies with the clock frequency CK synchronously so that the torque varies with the torque synchronously.

Figure 5:
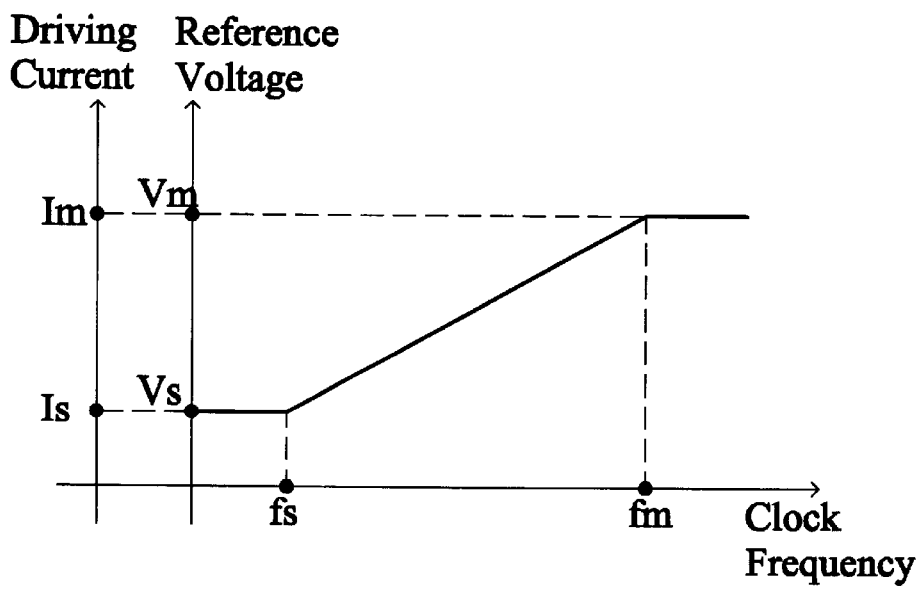
FIG. 5 is a graph of reference voltage and driving current versus pulse frequency of the stepping motor driving apparatus of FIG. 4A.

Please refer next to FIG. 5, which illustrates a graph of reference voltage and driving current versus pulse frequency of the stepping motor driving apparatus of FIG. 4A. The relation of the reference voltage and the driving current is first discussed as follows. The frequency fs is the minimum starting frequency and the corresponding reference voltage is the minimum reference voltage Vs. After the motor starts to run, if the motor speed gradually increases, the clock frequency starts from fs and gradually increases so that the reference voltage increases as well. If the clock frequency increases and becomes greater than the maximum frequency fm, the reference voltage becomes the reference voltage Vm and no longer increases so that the motor keeps on running at a constant speed. Moreover, there is a constant ratio relation between the reference voltage Vr and the driving current I, for example, I=Vr/3 Rs (Rs is the reference voltage). Thus, the driving current is the minimum current Is while the starting frequency is the minimum frequency fs. When the clock frequency increases, the driving current will increase synchronously. If the clock frequency increases and becomes larger than the maximum frequency fm, the driving current becomes the maximum reference current Im and no longer increases so that the motor keeps on running at a constant speed. If the ratio relation I=Vr/3 Rs holds, the axis scale of the driving current is ⅓ Rs times the axis scale of the reference voltage and then the two curves will be overlapped, as shown in FIG. 5. To be noticed, the variation of the clock signal CK is smooth while the motor speed is adjusted, and thus the variation of the driving current is smooth (since the driving current can be calculated by the reference voltage and the reference voltage directly relates with the variation of the clock frequency). Consequently, it does not cause vibration on the motor, noise problem, and so forth. It also controls the variation of torque dynamically as the motor speed varies and provides enough torque for the system's use.

The graph of FIG. 5 is only an example for illustration; the curve is not limited to be a linear curve but can be further plotted as an optimum curve according to the property of the stepping motor and the system.

On the other hand, when the system fails and causes the stepping motor to run stiff, the system will reduce the driving current to the lowest automatically (since the driving current is lowest while the motor speed is lowest). It effectively avoids excessive heating and damage to the stepping motor or even destroying it and therefore increases the security to the system. Hence, the system can use the driving current to the utmost instead of reducing the maximum driving current flow due to the safety consideration. The driving apparatus according to the invention provides higher running speed and can be applied more widely.

The stepping motor driving apparatus with dynamic torque control according to the invention at least has the following advantages:

1. It improves the vibration on the motor by using the adjustment of the driving current and raises the rate of power usage.
2. It provides the protection of over-current flow while the system fails to prevent the stepping motor from being destroyed.
3. The motor speed can be used to the utmost and the operation property of the stepping motor can be thus enhanced.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A stepping motor driving apparatus with dynamic torque control, capable of driving a stepping motor, the stepping motor driving apparatus comprising:
    a motor controller for receiving a control signal and outputting a clock signal accordingly;
    a frequency-to-voltage converter coupled with the motor controller, for outputting a reference voltage according to the clock signal; and
    a motor driver coupled to the motor controller and the frequency-to-voltage converter, for outputting a driving signal to drive the stepping motor according to the clock signal and the driving signal.

2. The stepping motor driving apparatus according to claim 1, wherein the frequency-to-voltage converter comprises:
    a frequency counter for receiving the clock signal and outputting a counting signal accordingly; and
    a digital-to-analogue converter coupled with the frequency counter, for outputting the reference voltage according to the counting signal.

3. The stepping motor driving apparatus according to claim 2, wherein the motor driver is a constant current driver.

4. The stepping motor driving apparatus according to claim 2, wherein the driving apparatus is disposed in a scanner.

5. The stepping motor driving apparatus according to claim 2, wherein the driving apparatus is disposed in a fax machine.

6. The stepping motor driving apparatus according to claim 2, wherein the driving apparatus is disposed in a copying machine.

7. The stepping motor driving apparatus according to claim 1, wherein the motor driver is a constant current driver.

8. The stepping motor driving apparatus according to claim 1, wherein the driving apparatus is disposed in a scanner.

9. The stepping motor driving apparatus according to claim 1, wherein the driving apparatus is disposed in a fax machine.

10. The stepping motor driving apparatus according to claim 1, wherein the driving apparatus is disposed in a copying machine.

11. The stepping motor driving apparatus according to claim 1, wherein the driving apparatus is disposed in a printer.

12. The stepping motor driving apparatus according to claim 1, wherein the driving apparatus is disposed in a Multi-Function Peripheral (MFP).

* * * * *